(12) United States Patent
Murase et al.

(10) Patent No.: US 11,525,395 B2
(45) Date of Patent: Dec. 13, 2022

(54) TURBOCHARGER

(71) Applicant: TOYOTA JIDOSHA KABUSHIKI KAISHA, Toyota (JP)

(72) Inventors: Takeshi Murase, Iwakura (JP); Masaaki Matsuda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/462,691

(22) Filed: Aug. 31, 2021

(65) Prior Publication Data

US 2022/0154639 A1 May 19, 2022

(30) Foreign Application Priority Data

Nov. 18, 2020 (JP) .............................. JP2020-191697

(51) Int. Cl.
*F02B 37/18* (2006.01)
*F02C 6/12* (2006.01)
*F01D 17/14* (2006.01)

(52) U.S. Cl.
CPC .............. *F02C 6/12* (2013.01); *F01D 17/146* (2013.01); *F02B 37/18* (2013.01); *F02B 37/186* (2013.01); *F05D 2220/40* (2013.01)

(58) Field of Classification Search
CPC ........ F02C 6/12; F01D 17/146; F01D 17/105; F02B 37/18; F02B 37/186; F05D 2220/40
See application file for complete search history.

(56) References Cited

U.S. PATENT DOCUMENTS

| 2012/0312010 | A1 | 12/2012 | Yasoshima | |
|---|---|---|---|---|
| 2014/0366530 | A1* | 12/2014 | Murayama | F02B 37/183 60/602 |
| 2017/0030261 | A1* | 2/2017 | Yasoshima | F02B 37/186 |
| 2019/0093549 | A1* | 3/2019 | Sadamitsu | F02B 37/183 |
| 2020/0173351 | A1* | 6/2020 | Saeki | F01D 17/105 |
| 2021/0033022 | A1* | 2/2021 | Ebert | F02B 37/183 |

FOREIGN PATENT DOCUMENTS

| JP | 2011-179401 A | 9/2011 | |
| JP | 6669235 B1 * | 3/2020 | ........... F01D 17/105 |
| JP | 2020-084923 A | 6/2020 | |

* cited by examiner

*Primary Examiner* — Audrey B. Walter
*Assistant Examiner* — Edward Bushard
(74) *Attorney, Agent, or Firm* — Oliff PLC

(57) ABSTRACT

As seen in a section parallel to a central axis of a shaft and including the center of gravity of a valve surface, with respect to the center of gravity, an end of the valve surface on the side of a first shaft direction is located on the side of a first direction in a direction orthogonal to the central axis of the shaft. As seen in a section orthogonal to the central axis of the shaft and including the center of gravity when the central axis of the shaft and a central axis of a through-hole coincide with each other, with respect to the center of gravity, an end of the valve surface on the side of a second direction in a direction along the valve seat surface is located on the side of the first direction in a direction orthogonal to the valve seat surface.

5 Claims, 9 Drawing Sheets

TURBOCHARGER

CROSS-REFERENCE TO RELATED APPLICATION

This application claims priority to Japanese Patent Application No. 2020-191697 filed on Nov. 18, 2020, incorporated herein by reference in its entirety.

BACKGROUND

1. Technical Field

The present disclosure relates to a turbocharger.

2. Description of Related Art

The turbocharger described in Japanese Unexamined Patent Application Publication No. 2020-084923 (JP 2020-084923 A) includes a turbine wheel, a turbine housing, a wastegate valve, and a link mechanism. The turbine housing houses the turbine wheel. The turbine housing defines bypass passages. The bypass passages provide a bypass between an exhaust gas upstream side and an exhaust gas downstream side relative to the turbine wheel. The turbine housing has a valve seat surface that contacts the wastegate valve when the wastegate valve is in a closed state. Further, the turbine housing has a through-hole that extends through a wall of the turbine housing.

The wastegate valve opens and closes the bypass passages. The wastegate valve includes a shaft and a valve body. The shaft extends through the through-hole and is rotatably supported by the turbine housing. The valve body extends in a radial direction of the shaft from an end of the shaft that is located inside the turbine housing. The valve body has a valve surface that is a flat surface facing the valve seat surface when the wastegate valve is in the closed state. The shaft and the valve body are an integrally molded part.

The link mechanism is coupled to an end of the shaft that is located outside the turbine housing. The link mechanism transmits a driving force from an actuator to the wastegate valve. The wastegate valve opens and closes the bypass passage based on the driving force from the link mechanism. When the wastegate valve is in the closed state, the link mechanism applies a force directed from the valve surface toward the valve seat surface to the end of the shaft located outside the turbine housing.

Further, the valve surface is inclined relatively to a central axis of the shaft. Specifically, the valve surface is inclined so as to be further separated from the central axis of the shaft as it extends further in one of directions along the central axis of the shaft that is a direction from the outside toward the inside of the turbine housing.

SUMMARY

In a turbocharger like JP 2020-084923 A, since the valve surface of the valve body is inclined as described above, formation of a wide gap between the valve surface and the valve seat surface can be prevented even when the shaft inclines relatively to the through-hole under a force from the link mechanism while the wastegate valve is in the closed state. However, there remains a possibility that a gap may form between the valve surface and the valve seat surface depending on the direction of the force from the link mechanism.

A turbocharger for solving this problem includes: a turbine wheel that is rotated by a flow of exhaust gas; a turbine housing that houses the turbine wheel and defines a bypass passage that provides a bypass between an exhaust gas upstream side and an exhaust gas downstream side relative to the turbine wheel; a wastegate valve that opens and closes the bypass passage; and a link mechanism that transmits a driving force from an actuator to the wastegate valve. The turbine housing has a valve seat surface that is a flat surface contacting the wastegate valve when the wastegate valve is in a closed state, and a through-hole that extends through a wall of the turbine housing. The wastegate valve has a shaft that extends through the through-hole and is rotatably supported by the turbine housing, and a valve body that extends in a radial direction of the shaft from an end of the shaft that is located inside the turbine housing. The valve body has a valve surface that is a flat surface facing the valve seat surface when the wastegate valve is in the closed state. The shaft and the valve body are an integrally molded part. When a direction of a force that the link mechanism applies to an end of the shaft that is located outside the turbine housing while the wastegate valve is in the closed state is called a first direction, and one of directions along a central axis of the shaft that is a direction from the outside toward the inside of the turbine housing is called a first shaft direction, the first direction is inclined relatively to the valve seat surface as seen from a direction along a central axis of the through-hole; the valve seat surface is parallel to the central axis of the through-hole; as seen in a section that is parallel to the central axis of the shaft and includes the center of gravity of the valve surface, with respect to the center of gravity, an end of the valve surface on the side of the first shaft direction is located on the side of the first direction in a direction orthogonal to the central axis of the shaft; and as seen in a section that is orthogonal to the central axis of the shaft and includes the center of gravity of the valve surface when the central axis of the shaft and the central axis of the through-hole coincide with each other and moreover the wastegate valve is in the closed state, with respect to the center of gravity, an end of the valve surface on the opposite side from the first direction in a direction along the valve seat surface is located on the side of the first direction in a direction orthogonal to the valve seat surface.

In this turbocharger, a force in the first direction acts on the end of the shaft located outside the turbine housing when the wastegate valve is in the closed state. Then, the central axis of the shaft inclines relatively to the central axis of the through-hole such that the end of the shaft located outside the turbine housing is displaced in the first direction and that the end of the shaft located inside the turbine housing is displaced in the opposite direction from the first direction. In the above configuration, the valve surface is not only inclined relatively to the extension direction of the central axis of the shaft but also inclined in the direction orthogonal to the central axis of the shaft. That is, the valve surface is inclined according to the inclination of the first direction relative to the valve seat surface. Thus, even when a force in the first direction that is inclined relatively to the valve seat surface acts on the shaft, a gap is less likely to form between the valve surface and the valve seat surface.

In the above configuration, the valve surface may have an annular groove that is depressed, and the annular groove may extend in the valve surface so as to surround the bypass passage when the wastegate valve is in the closed state.

In this configuration, a hollow is created between an inner surface of the annular groove and the valve seat surface when the wastegate valve is in the closed state. If there is a gap between the valve surface and the valve seat surface, this hollow is present in a flow passage through which the exhaust gas leaks. As the cross-sectional area of the flow passage increases suddenly at this hollow, the flow of the exhaust gas is disturbed and the resistance to the flow of the exhaust gas increases. Thus, even when there is a gap between the valve surface and the valve seat surface, the amount of exhaust gas that leaks can be reduced by the hollow defined by the annular groove.

In the above configuration, the wastegate valve may have a protrusion that protrudes from the valve surface, and the protrusion may be inserted in the bypass passage when the wastegate valve is in the closed state.

In this configuration, to reach between the valve surface and the valve seat surface while the wastegate valve is in the closed state, the exhaust gas flows through a space between an outer circumferential surface of the protrusion and an inner circumferential surface of the bypass passage. Thus, the cross-sectional area of the flow passage through which the exhaust gas reaches between the valve surface and the valve seat surface can be reduced by the presence of the protrusion. Compared with a configuration in which the protrusion is not provided, this configuration can reduce the amount of exhaust gas that reaches between the valve surface and the valve seat surface.

In the above configuration, a leading end surface of the protrusion may have a recess that is depressed, and at least part of an inner surface of the recess may be a curved surface.

In this configuration, when the wastegate valve is in the closed state, part of the exhaust gas that has hit the inner surface of the recess is guided by the curved surface so as to flow back from downstream toward upstream. The exhaust gas thus flowing back weakens the flow of the exhaust gas from upstream toward downstream, so that the force of the exhaust gas trying to open the wastegate valve can be reduced.

In the above configuration, the turbine housing may define a plurality of bypass passages that opens in the valve seat surface. The valve body may have a depression that is depressed from the valve surface. The depression may be located at a portion of the valve body facing a portion that is located between the bypass passages when the wastegate valve is in the closed state.

In this configuration, the depression is present at the portion of the valve body facing the portion of the valve seat surface that is located between the bypass passages and tends to be affected by the heat of the exhaust gas. Thus, in this configuration, even when the valve seat surface thermally expands under the influence of the heat of the exhaust gas, it is less likely that only the portion of the valve seat surface located between the bypass passages may contact the valve surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

General Configuration of Internal Combustion Engine

A first embodiment of the present disclosure will be described below in accordance with FIG. 1 to FIG. 9. First, the general configuration of an internal combustion engine 10 of a vehicle to which a turbocharger 20 of the present disclosure is applied will be described.

Figure 1:
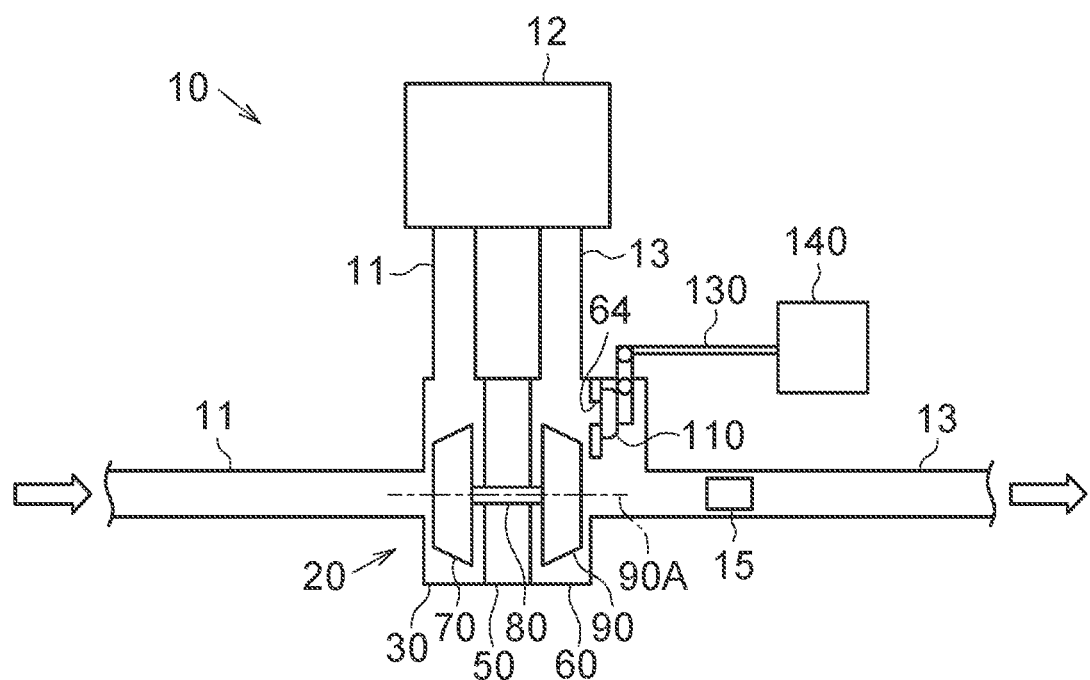
FIG. 1 is a schematic view of an internal combustion engine according to a first embodiment.

As shown in FIG. 1, the internal combustion engine 10 includes an intake passage 11, a cylinder 12, an exhaust passage 13, a catalyst 15, and the turbocharger 20. The intake passage 11 introduces intake air from an outside of the internal combustion engine 10. The cylinder 12 is connected to the intake passage 11. In the cylinder 12, fuel and the intake air are mixed and combusted. The exhaust passage 13 is connected to the cylinder 12. The exhaust passage 13 discharges exhaust gas from the cylinder 12. The catalyst 15 is located at an intermediate portion of the exhaust passage 13. The catalyst 15 removes harmful components from the exhaust gas flowing through the exhaust passage 13.

The turbocharger 20 includes a compressor housing 30, a bearing housing 50, a turbine housing 60, a compressor wheel 70, a coupling shaft 80, and a turbine wheel 90.

The compressor housing 30 is mounted at an intermediate portion of the intake passage 11. The turbine housing 60 is mounted at a portion of the exhaust passage 13, upstream of the catalyst 15. The bearing housing 50 is fixed to each of the compressor housing 30 and the turbine housing 60 and connects the compressor housing 30 and the turbine housing 60 to each other. Thus, the turbocharger 20 is provided across the intake passage 11 and the exhaust passage 13.

The turbine housing 60 houses the turbine wheel 90. The bearing housing 50 houses the coupling shaft 80. The bearing housing 50 rotatably supports the coupling shaft 80 through a bearing (not shown). A first end of the coupling shaft 80 is connected to the turbine wheel 90. The compressor housing 30 houses the compressor wheel 70. The compressor wheel 70 is connected to a second end of the coupling shaft 80. Thus, the compressor wheel 70 is coupled to the turbine wheel 90 through the coupling shaft 80.

When the turbine wheel 90 is rotated by exhaust gas flowing through an inside of the turbine housing 60, the compressor wheel 70 is rotated along with the turbine wheel 90 through the coupling shaft 80. As the compressor wheel 70 rotates, the intake air inside the compressor housing 30 is compressed.

Configuration of Turbocharger

Next, the specific configuration of the turbocharger 20 will be described.

Figure 2:
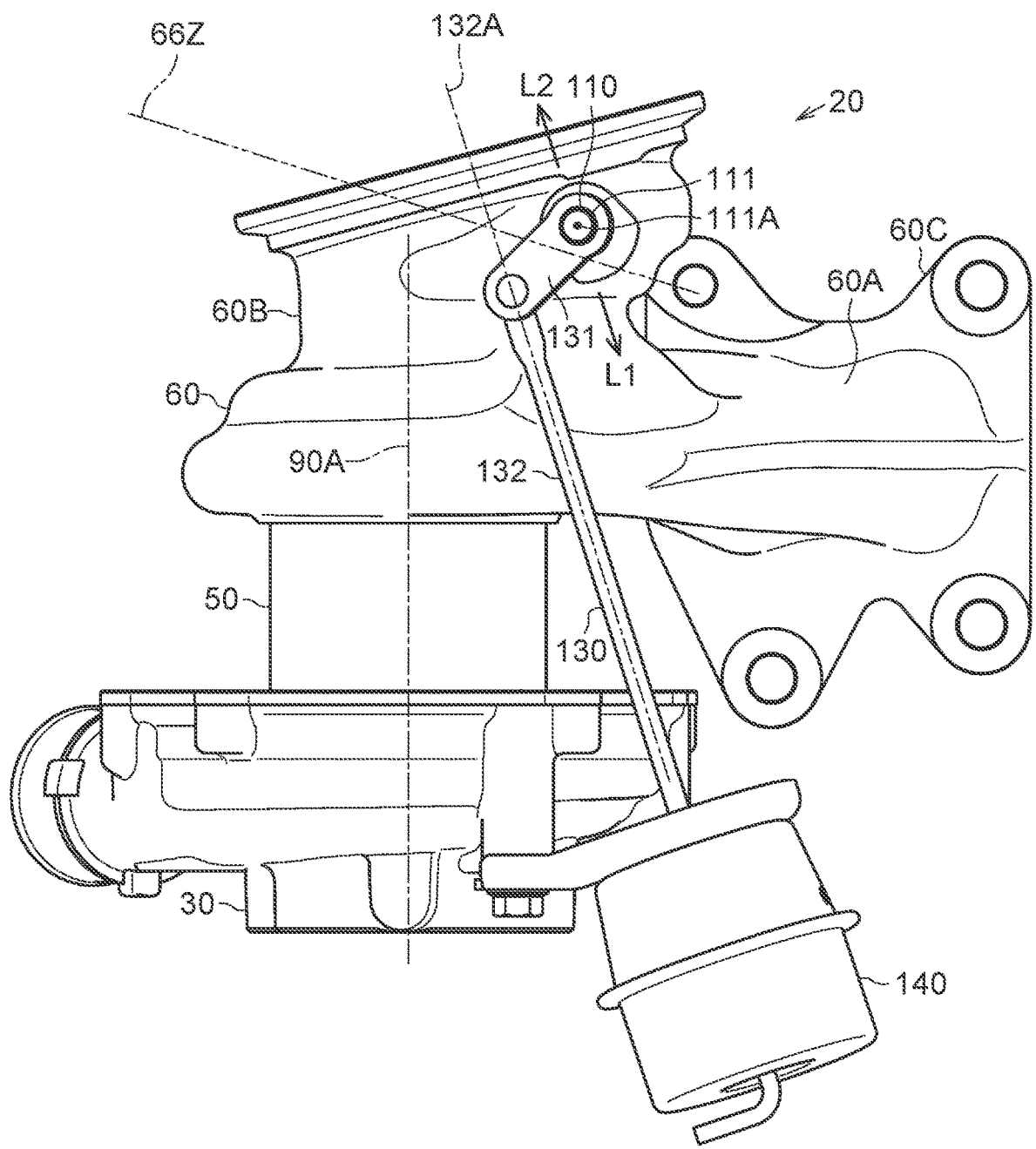
FIG. 2 is a front view of a turbocharger according to the embodiment.

As shown in FIG. 2, the turbine housing 60 includes an arc part 60A, a tubular part 60B, and a flange part 60C. The tubular part 60B has a substantially cylindrical shape. The tubular part 60B extends roughly along a rotational axis 90A that is the center of rotation of the turbine wheel 90. The arc part 60A extends so as to surround the outer circumference of the tubular part 60B and has a substantially arc shape. The flange part 60C is located at an upstream end of the arc part 60A. The flange part 60C is fixed to the exhaust passage 13 at a portion on an upstream side relative to the turbine housing 60.

Figure 3:
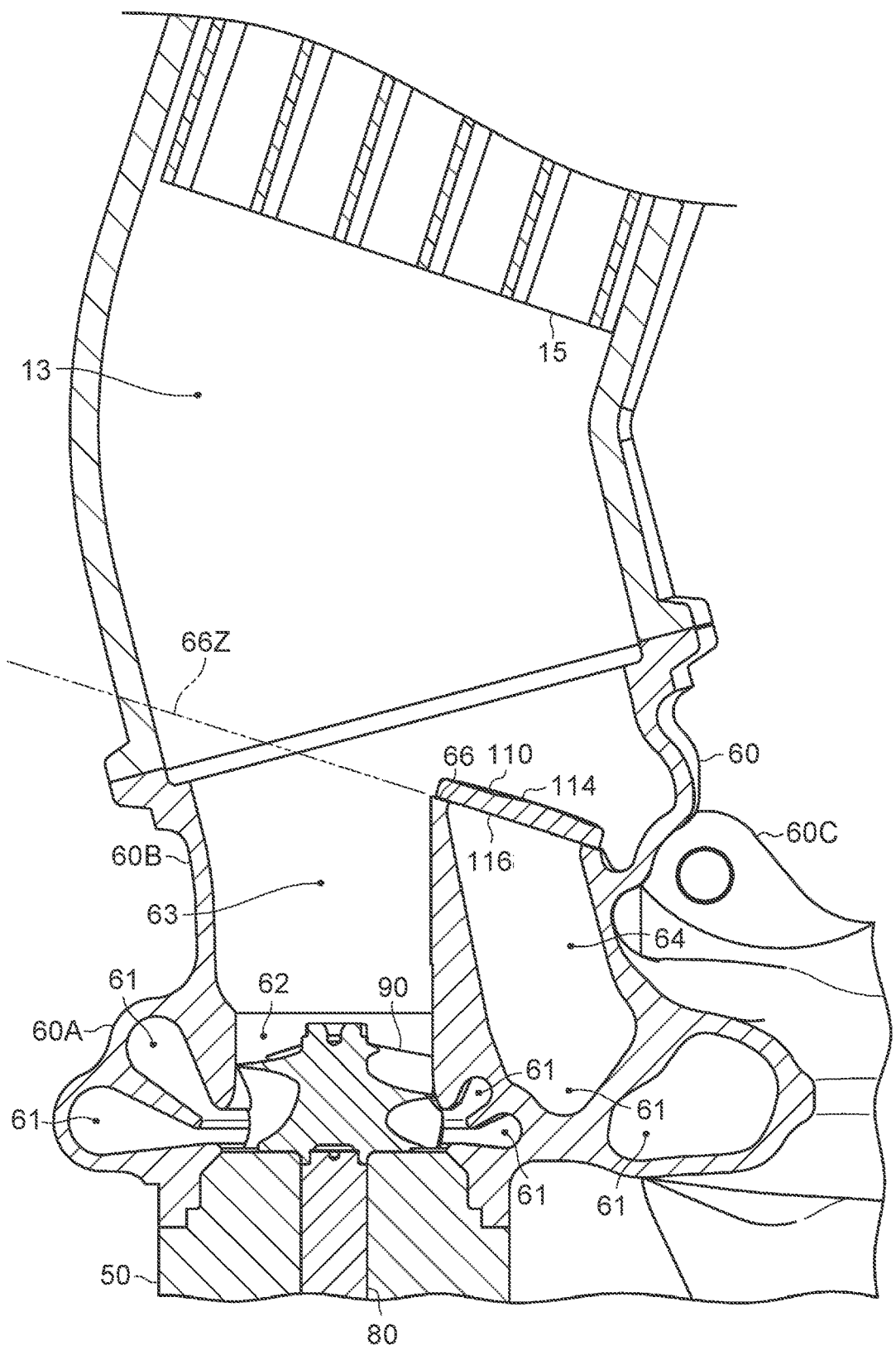
FIG. 3 is a sectional view showing a configuration around a turbine housing according to the embodiment.

As shown in FIG. 3, the turbine housing 60 defines, as space for the exhaust gas to flow through, two scroll passages 61, a housing space 62, an exhaust passage 63, and two bypass passages 64. In FIG. 3, one bypass passage 64 is shown. Each scroll passage 61 is located inside the arc part 60A and the tubular part 60B. The scroll passages 61 extend in an arc shape so as to surround the turbine wheel 90. Upstream ends of the scroll passages 61 are connected to the exhaust passage 13, on the upstream side relative to the turbine housing 60. Downstream ends of the scroll passages 61 are connected to the housing space 62. The two scroll passages 61 extend substantially parallel to each other. The housing space 62 is a part of an internal space of the tubular part 60B in which the turbine wheel 90 is located. The housing space 62 is connected to the exhaust passage 63. The exhaust passage 63 is a part of the internal space of the tubular part 60B that includes an end of the tubular part 60B on the opposite side from the bearing housing 50, i.e., the upper end thereof in FIG. 3. A downstream end of the exhaust passage 63 is connected to the exhaust passage 13, on the downstream side relative to the turbine housing 60. Each bypass passage 64 is located inside the arc part 60A and the tubular part 60B. Each bypass passage 64 connects the scroll passage 61 and the exhaust passage 63 to each other. Thus, the bypass passages 64 provide a bypass between an exhaust gas upstream side and an exhaust gas downstream side relative to the turbine wheel 90.

Figure 4:
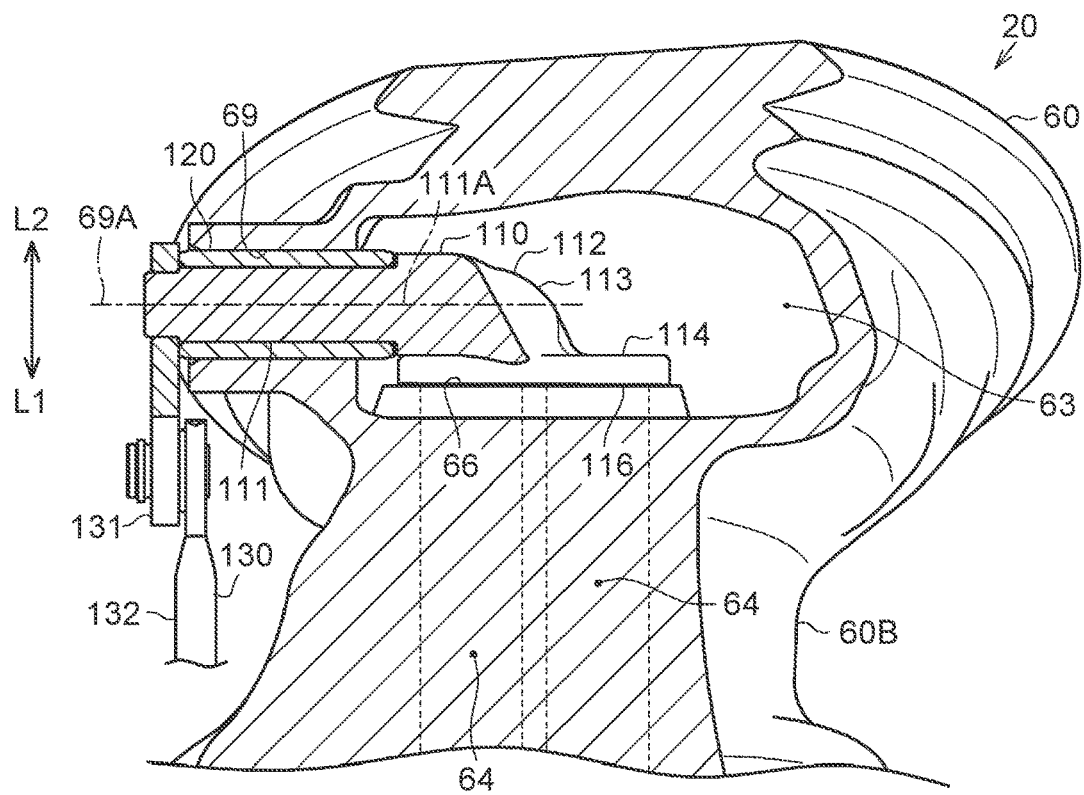
FIG. 4 is a sectional view showing a configuration around a wastegate valve according to the embodiment.
Figure 9:
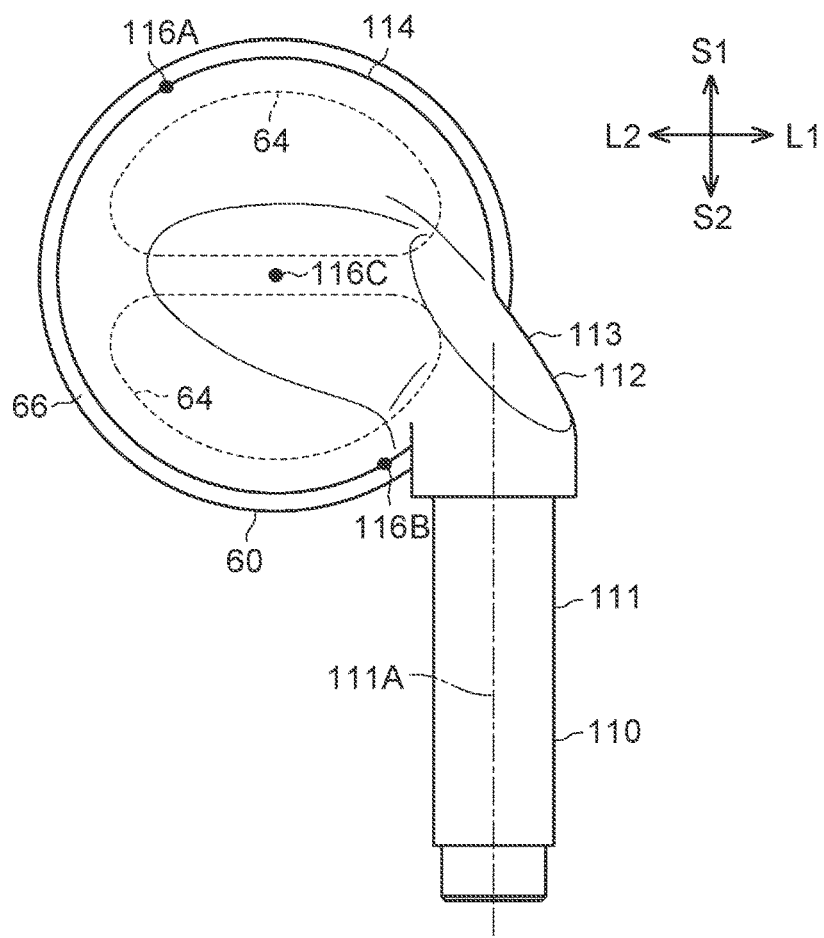
FIG. 9 is a view illustrating a configuration around the wastegate valve according to the embodiment.

As shown in FIG. 4, the turbine housing 60 includes a valve seat surface 66 and a through-hole 69. The valve seat surface 66 is a part of an inner wall surface of the turbine housing 60 defining the exhaust passage 63 and is a flat surface surrounding opening edges of the two bypass passages 64. Thus, each bypass passage 64 opens in the valve seat surface 66. A part of an inner surface of the turbine housing 60 that includes the valve seat surface 66 is raised compared with other portions. As shown in FIG. 9, the opening edge of each bypass passage 64 has a substantially semicircular shape. The bypass passages 64 are located side by side. Thus, when seen from a direction orthogonal to the valve seat surface 66, a shape combining the opening edges of the two bypass passages 64 is circular as a whole.

As shown in FIG. 4, the through-hole 69 extends through a wall of the turbine housing 60. The through-hole 69 is located at a part of the wall of the turbine housing 60 that defines the exhaust passage 63. When seen from a direction along a central axis 69A of the through-hole 69, the through-hole 69 has a shape of a substantially perfect circle. The central axis 69A of the through-hole 69 is parallel to the valve seat surface 66.

As shown in FIG. 2 and FIG. 4, the turbocharger 20 includes a wastegate valve 110, a bush 120, a link mechanism 130, and an actuator 140. As shown in FIG. 4, the bush 120 has a substantially cylindrical shape. The outside diameter of the bush 120 is substantially equal to the inside diameter of the through-hole 69. The bush 120 is located inside the through-hole 69.

As shown in FIG. 4, the wastegate valve 110 includes a shaft 111 and a valve body 112. The shaft 111 has a substantially columnar shape. The outside diameter of the shaft 111 is slightly smaller than the inside diameter of the bush 120. The shaft 111 is passed through the bush 120. Thus, the shaft 111 extends through the through-hole 69 of the turbine housing 60. The turbine housing 60 rotatably supports the shaft 111 through the bush 120.

Figure 6:
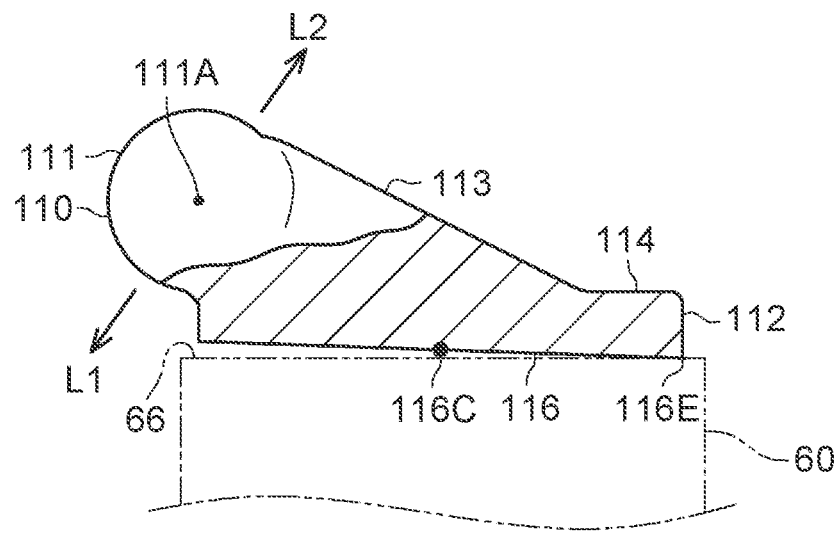
FIG. 6 is a right side view including a partial sectional view of the wastegate valve according to the embodiment.
Figure 7:
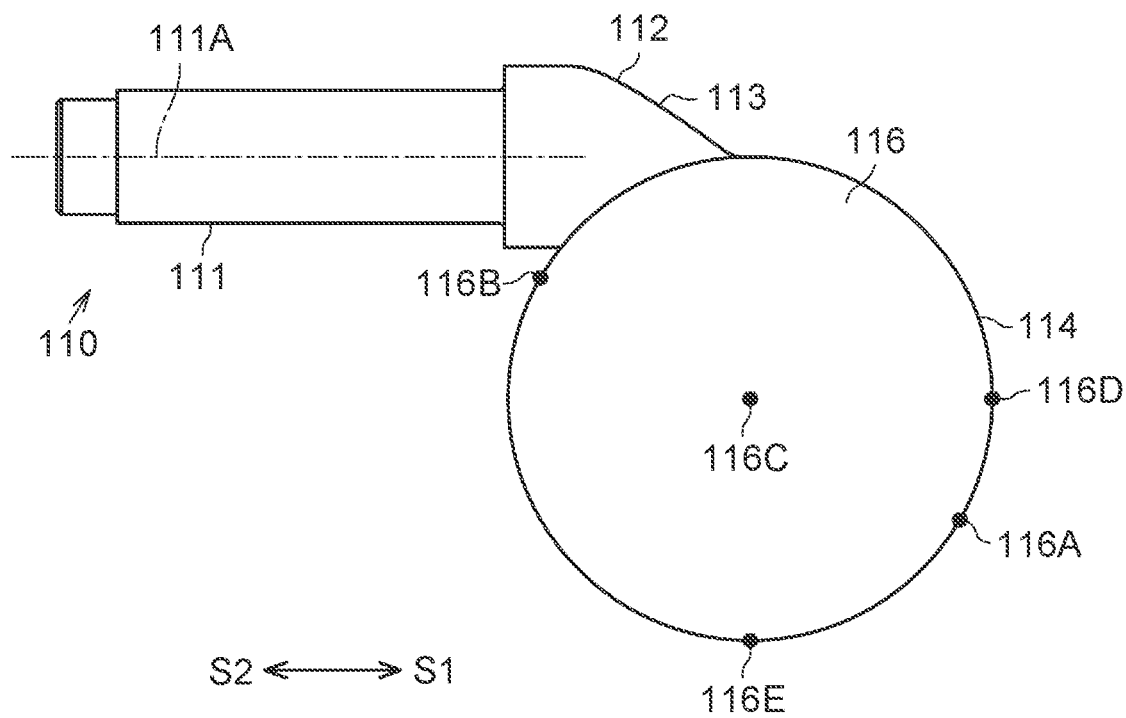
FIG. 7 is a bottom view of the wastegate valve according to the embodiment.

As shown in FIG. 6, the valve body 112 includes a connection part 113 and a valve main body 114. The connection part 113 extends from the shaft 111 in a radial direction of the shaft 111. As shown in FIG. 4, the connection part 113 is located at an end of the shaft 111 that is located inside the turbine housing 60, i.e., at the right end of the shaft 111 in FIG. 4. As shown in FIG. 6, the valve main body 114 is connected to an end of the connection part 113 that is located on a radially outer side of the shaft 111. As shown in FIG. 7, the valve main body 114 has a substantially circular plate shape. A surface of the valve main body 114 on the opposite side from the connection part 113, i.e., the surface thereof on the near side in the sheet of FIG. 7 functions as a valve surface 116. The valve surface 116 is a flat surface. The valve surface 116 faces the valve seat surface 66 when the wastegate valve 110 is in a closed state. The wastegate valve 110 is an integrally molded part in which the shaft 111 and the valve body 112 are integrally molded. The wastegate valve 110 is integrally molded, for example, by casting.

As shown in FIG. 2, the link mechanism 130 includes a link arm 131 and a link rod 132. The link arm 131 has a substantially elongated plate shape. An end portion including a first end of the link arm 131, i.e., the right end of the link arm 131 in FIG. 2 is coupled to an end of the shaft 111 that is located outside the turbine housing 60. The link arm 131 extends in the radial direction of the shaft 111. The link rod 132 has a substantially rod-like shape. An end portion including a first end of the link rod 132, i.e., the upper end of the link rod 132 in FIG. 2 is coupled to an end portion including a second end of the link arm 131, i.e., the left end of the link arm 131 in FIG. 2. Thus, the link rod 132 is coupled to a portion separated from the center of coupling between the link arm 131 and the shaft 111 in the radial direction.

As shown in FIG. 2, the actuator 140 is fixed on the compressor housing 30. The actuator 140 is coupled to a second end of the link rod 132, i.e., the lower end of the link rod 132 in FIG. 2. The actuator 140 transmits a driving force to the link mechanism 130. The link mechanism 130 transmits the driving force from the actuator 140 to the wastegate valve 110 to open or close the bypass passages 64.

Specifically, when the wastegate valve 110 shifts from an open state to a closed state, the driving force of the actuator 140 causes the link rod 132 to move in a direction from the first end toward the second end, i.e., a roughly downward direction in FIG. 2. Then, the link arm 131 converts the motion of the link rod 132 into rotary motion and rotates in a first rotation direction of circumferential directions of the shaft 111, i.e., in a counterclockwise direction in FIG. 2. This causes the wastegate valve 110 to rotate in the first rotation direction of the circumferential directions of the shaft 111.

Then, the valve surface 116 of the wastegate valve 110 contacts the valve seat surface 66 of the turbine housing 60. Thus, when the wastegate valve 110 is in the closed state, the valve surface 116 of the wastegate valve 110 faces the valve seat surface 66 of the turbine housing 60, so that the downstream ends of the bypass passages 64 are covered by the valve surface 116 of the wastegate valve 110. In this embodiment, the closed state is a state where the valve surface 116 of the wastegate valve 110 contacts the valve seat surface 66 of the turbine housing 60 and the wastegate valve 110 cannot rotate any further toward the closing side.

On the other hand, when the wastegate valve 110 shifts from the closed state to the open state, the driving force of the actuator 140 causes the link rod 132 to move in a direction from the second end toward the first end, i.e., in a roughly upward direction in FIG. 2. Then, the link arm 131 converts the motion of the link rod 132 into rotary motion and rotates in a second rotation direction of the circumferential directions of the shaft 111, i.e., in a clockwise direction in FIG. 2. This causes the wastegate valve 110 to rotate in the second rotation direction of the circumferential directions of the shaft 111. Then, the valve surface 116 of the wastegate valve 110 is separated from the valve seat surface 66 of the turbine housing 60. Thus, when the wastegate valve 110 is in the open state, the downstream ends of the bypass passages 64 are not covered by the valve surface 116 of the wastegate valve 110.

Force Exerted by Link Mechanism

Next, a force exerted by the link mechanism 130 will be described.

Hereinafter, the direction of a force that the link mechanism 130 applies to the end of the shaft 111 located outside the turbine housing 60 when the wastegate valve 110 is in the closed state will be referred to as a first direction L1, and the opposite direction from the first direction L1 will be referred to as a second direction L2.

Figure 8:
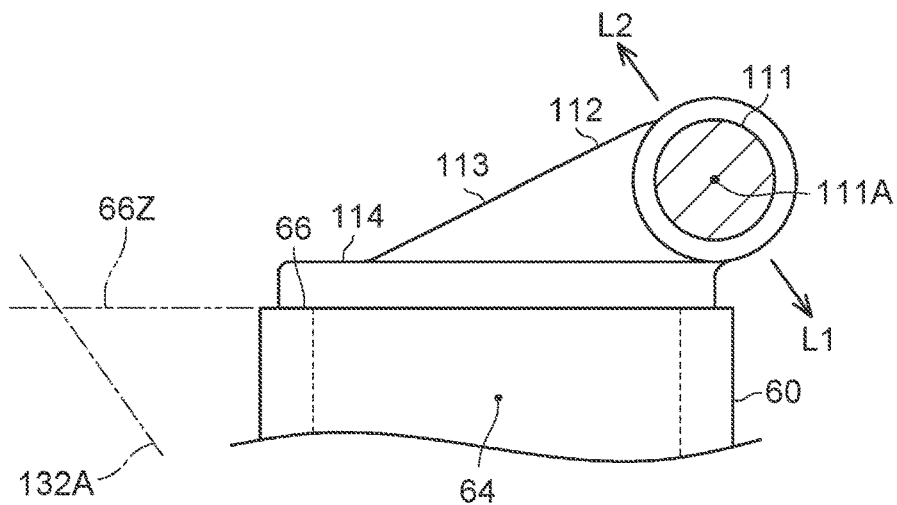
FIG. 8 is a view illustrating a configuration around the wastegate valve according to the embodiment.

As shown in FIG. 2, an imaginary plane including the valve seat surface 66 is defined as a valve seat imaginary plane 66Z. When the wastegate valve 110 is in the closed state, as seen from a direction along the central axis 69A of the through-hole 69, an axis 132A of the link rod 132 intersects with the valve seat imaginary plane 66Z. In this case, one example of the acute angle formed by the axis 132A of the link rod 132 and the valve seat imaginary plane 66Z is about 55°. As a result, as shown in FIG. 8, the first direction L1 is inclined relatively to the valve seat surface 66 when seen from the direction along the central axis 69A of the through-hole 69. The force in the first direction L1 transmitted from the link rod 132 is converted into rotary motion by the link arm 131 and transmitted to the shaft 111. However, when the wastegate valve 110 is in the closed state, the shaft 111 cannot rotate any further. Therefore, a force in the substantially same direction as the direction in which the link rod 132 moves, i.e., in the first direction L1 acts on the shaft 111 through the link arm 131.

Configuration of Valve Surface

Next, the configuration of the valve surface 116 will be specifically described.

Hereinafter, one of directions along the central axis 111A of the shaft 111 that is a direction from the outside toward the inside of the turbine housing 60 will be referred to as a first shaft direction S1, and the opposite direction from the first shaft direction S1 will be referred to as a second shaft direction S2.

Figure 5:
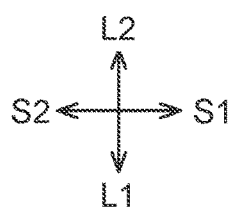
FIG. 5 is a front view including a partial sectional view of the wastegate valve according to the embodiment.
Figure 5:
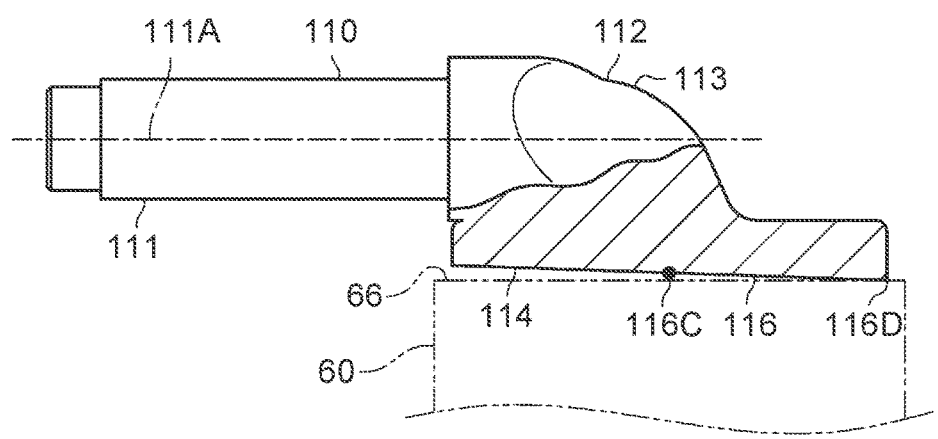

As shown in FIG. 5, a case will be assumed where the central axis 111A of the shaft 111 and the central axis 69A of the through-hole 69 coincide with each other and the wastegate valve 110 is in the closed state. On this assumption, the wastegate valve 110 as seen in a section that is parallel to the central axis 111A of the shaft 111 and includes the center of gravity 116C of the valve surface 116 will be considered. In this case, the valve surface 116 is inclined so as to be further displaced in the first direction L1, i.e., toward the lower side in FIG. 5 as it extends further in the first shaft direction S1. Therefore, with respect to the center of gravity 116C, an end 116D of the valve surface 116 in the first shaft direction S1 is located on the side of the first direction L1 in a direction orthogonal to the central axis 111A of the shaft 111.

In the section of FIG. 5, the actual acute angle formed by the valve surface 116 and the central axis 111A of the shaft 111 is, for example, about 0.1° to 1°. In FIG. 5, the acute angle formed by the valve surface 116 and the central axis 111A of the shaft 111 is shown in an exaggerated manner. As shown in FIG. 7, the center of gravity 116C is the geometric center of the valve surface 116.

Further, as shown in FIG. 6, a case will be assumed where the central axis 111A of the shaft 111 and the central axis 69A of the through-hole 69 coincide with each other and the wastegate valve 110 is in the closed state. On this assumption, the wastegate valve 110 as seen in a section that is orthogonal to the central axis 111A of the shaft 111 and includes the center of gravity 116C of the valve surface 116 will be considered. In this case, the valve surface 116 is inclined relatively to the valve seat surface 66. Specifically, the valve surface 116 is inclined such that the side of the second direction L2 in a direction along the valve seat surface 66, i.e., the right side in FIG. 6 is further displaced toward the side of the first direction L1 in the direction orthogonal to the valve seat surface 66, i.e., toward the lower side in FIG. 6. Therefore, with respect to the center of gravity 116C, an end 116E of the valve surface 116 on the side of the second direction L2 in the direction along the valve seat surface 66 is located on the side of the first direction L1 in the direction orthogonal to the valve seat surface 66.

In the section of FIG. 6, the actual acute angle formed by the valve surface 116 and the valve seat surface 66 is, for example, about 0.1° to 1°. In FIG. 6, the acute angle formed by the valve surface 116 and the valve seat surface 66 is shown in an exaggerated manner.

When the direction orthogonal to the valve seat surface 66 is called a height direction, the distance from the valve surface 116 to the central axis 111A of the shaft 111 in the height direction varies from one portion of the valve surface 116 to another as a result of the inclination of the valve surface 116 as described above. Specifically, a case will be assumed where the central axis 111A of the shaft 111 and the central axis 69A of the through-hole 69 coincide with each other and the wastegate valve 110 is in the closed state, as in the example described above. In this case, a highest point 116A at which the distance to the central axis 111A in the height direction is longest in the valve surface 116 is located farthest in the valve surface 116 on the side of the first direction L1 in the direction orthogonal to the valve seat surface 66. As shown in FIG. 7, the highest point 116A is located at an outer circumferential edge of the valve surface 116, between the end 116D of the valve surface 116 and the end 116E of the valve surface 116. A lowest point 116B at which the distance to the central axis 111A in the height direction is shortest in the valve surface 116 is located farthest in the valve surface 116 on the side of the second direction L2 in the direction orthogonal to the valve seat surface 66. As shown in FIG. 7, the lowest point 116B is located at the outer circumferential edge of the valve surface 116, at a position 180 degrees opposite from the highest point 116A across the center of gravity 116C.

Workings of Embodiment

As indicated by the solid arrows in FIG. 8, when the wastegate valve 110 is in the closed state, a force in the first direction L1, i.e., a force directed toward the right lower side in FIG. 8 acts on the end of the shaft 111 located outside the turbine housing 60. Then, the central axis 111A of the shaft 111 inclines relatively to the central axis 69A of the through-hole 69 such that the end of the shaft 111 located outside the turbine housing 60 is displaced in the first direction L1 and that the end of the shaft 111 located inside the turbine housing 60 is displaced in the second direction L2. As a result, the valve body 112 inclines relatively to the valve seat surface 66 according to the inclination of the shaft 111 relative to the through-hole 69. Specifically, the valve body 112 inclines such that a portion of the valve body 112 near the highest point 116A is separated from the valve seat surface 66 compared with a portion of the valve body 112 near the center of gravity 116C.

In this regard, when a case is assumed where the central axis 111A of the shaft 111 and the central axis 69A of the through-hole 69 coincide with each other and the wastegate valve 110 is in the closed state, the valve surface 116 is inclined in advance.

Specifically, the wastegate valve 110 as seen in a section parallel to the central axis 111A of the shaft 111 and including the center of gravity 116C of the valve surface 116 as shown in FIG. 5 will be considered. In this case, with respect to the center of gravity 116C, the end 116D of the valve surface 116 in the first shaft direction S1 is located on the side of the first direction L1 in the direction orthogonal to the central axis 111A of the shaft 111. Thus, the valve surface 116 is inclined relatively to the extension direction of the central axis 111A of the shaft 111 in anticipation of an inclination of the central axis 111A of the shaft 111 relative to the central axis 69A of the through-hole 69 due to a force in the first direction L1 that is an inclination in the direction orthogonal to the valve seat surface 66, i.e., the up-down direction in FIG. 8. Further, the wastegate valve 110 as seen in a section orthogonal to the central axis 111A of the shaft 111 and including the center of gravity 116C of the valve surface 116 as shown in FIG. 6 will be considered. In this case, with respect to the center of gravity 116C, the end 116E of the valve surface 116 on the side of the second direction L2 in the direction along the valve seat surface 66 is located on the side of the first direction L1 in the direction orthogonal to the valve seat surface 66. Thus, the valve surface 116 is inclined also in the direction orthogonal to the central axis 111A of the shaft 111 in anticipation of an inclination of the central axis 111A of the shaft 111 relative to the central axis 69A of the through-hole 69 due to a force in the first direction L1 that is an inclination in the direction along the valve seat surface 66, i.e., the left-right direction in FIG. 8. In this way, the valve surface 116 is not only inclined relatively to the extension direction of the central axis 111A of the shaft 111 but also inclined in the direction orthogonal to the central axis 111A of the shaft 111.

Effects of Embodiment (1-1) As described above, even when the valve body 112 inclines such that a portion of the valve body 112 near the highest point 116A is separated from the valve seat surface 66 compared with a portion of the valve body 112 near the center of gravity 116C due to a force in the first direction L1 that is inclined relatively to the valve seat surface 66, the valve surface 116, which is inclined in anticipation of this inclination, is less likely to incline relatively to the valve seat surface 66. As the likelihood of inclination of the valve surface 116 relative to the valve seat surface 66 is thus reduced, the valve surface 116 is more likely to maintain surface contact with the valve seat surface 66 and a gap is less likely to form between the valve surface 116 and the valve seat surface 66 while the wastegate valve 110 is in the closed state.

Second Embodiment

Configuration of Wastegate Valve

In the following, a second embodiment of the present disclosure will be described with reference to FIG. 10 to FIG. 14. In the second embodiment, the turbocharger 20 is different in that it includes a wastegate valve 210 in place of the wastegate valve 110. In the second embodiment, the description will be focused on differences from the first embodiment in terms of the wastegate valve 210, while the same components as in the first embodiment will be denoted by the same reference signs and the description thereof will be omitted or simplified.

Figure 10:
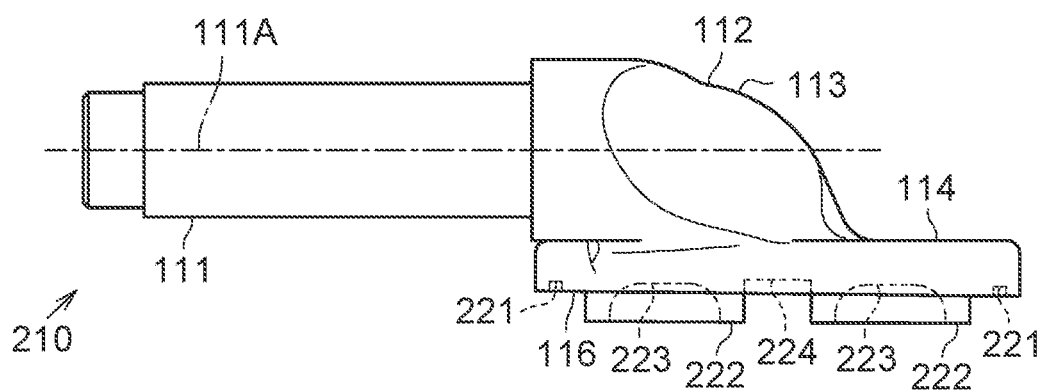
FIG. 10 is a front view of the wastegate valve according to a second embodiment.
Figure 12:
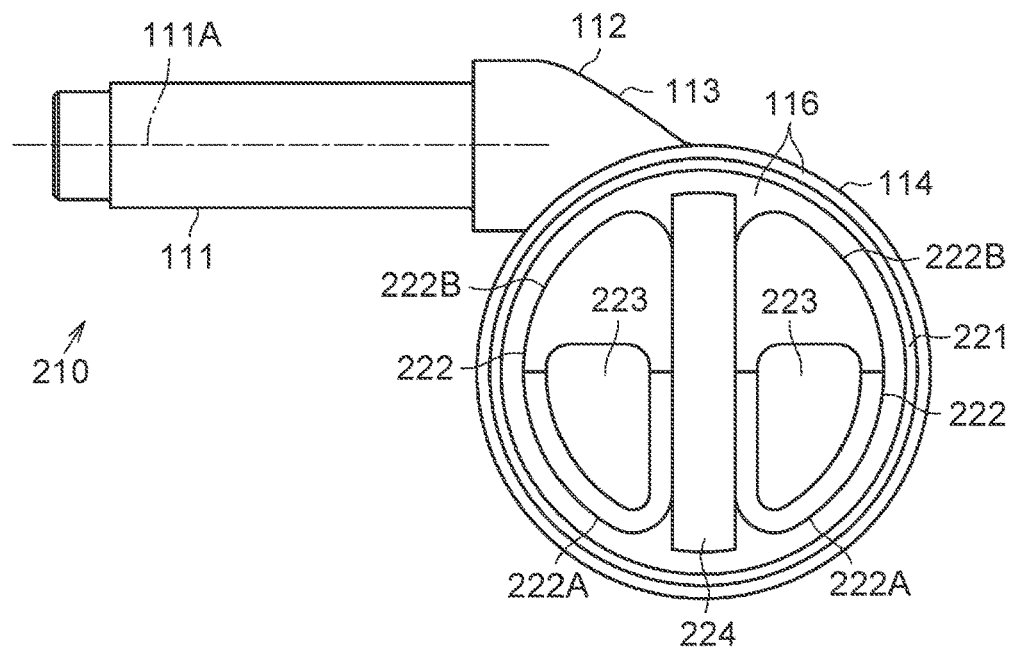
FIG. 12 is a bottom view of the wastegate valve according to the embodiment.
Figure 13:
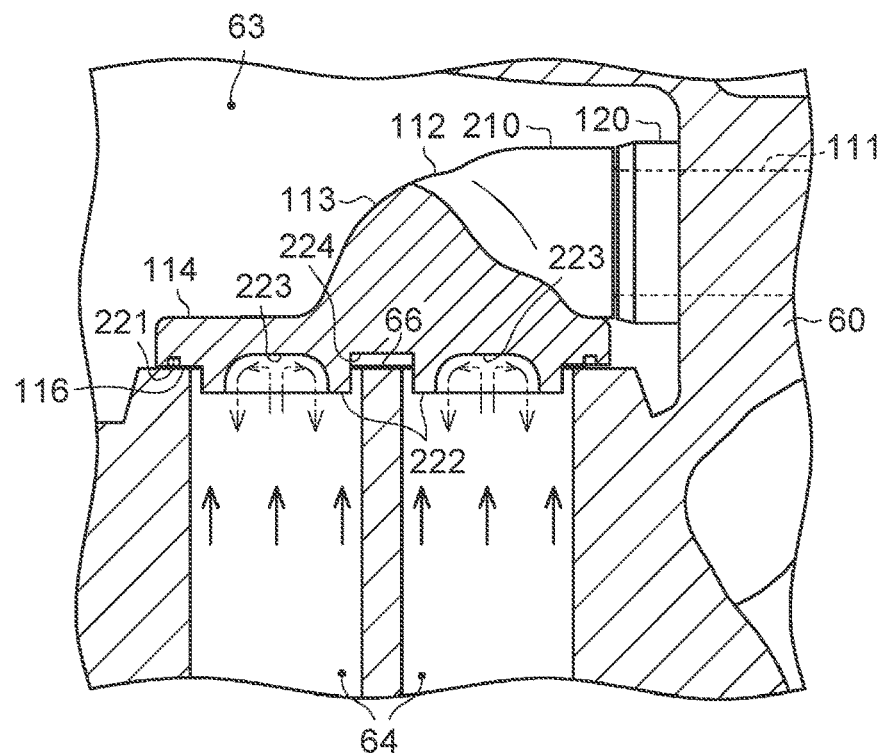
FIG. 13 is a view illustrating a configuration around the wastegate valve according to the embodiment.

As shown in FIG. 10, the valve main body 114 of the wastegate valve 210 includes an annular groove 221, two protrusions 222, two recesses 223, and a depression 224. The annular groove 221 is depressed from the valve surface 116. As shown in FIG. 12, the annular groove 221 has a substantially annular shape extending in the valve surface 116 along the outer circumferential edge of the valve surface 116. The annular groove 221 is located on a slightly inner side of the outer circumferential edge of the valve surface 116 in a radial direction, near the outer circumferential edge of the valve surface 116. Thus, as shown in FIG. 13, the annular groove 221 extends in the valve surface 116 so as to surround the two bypass passages 64 when the wastegate valve 210 is in a closed state.

As shown in FIG. 10, the protrusions 222 protrude from the valve surface 116. As shown in FIG. 12, when seen from a direction orthogonal to the valve surface 116, each protrusion 222 has a substantially semicircular shape. Each protrusion 222 is slightly smaller than an opening shape of the bypass passage 64. When the wastegate valve 210 is in the closed state, the protrusions 222 are located at the same positions as the bypass passages 64. Thus, as shown in FIG. 13, when the wastegate valve 210 is in the closed state, the protrusions 222 are inserted in the bypass passages 64.

Figure 11:
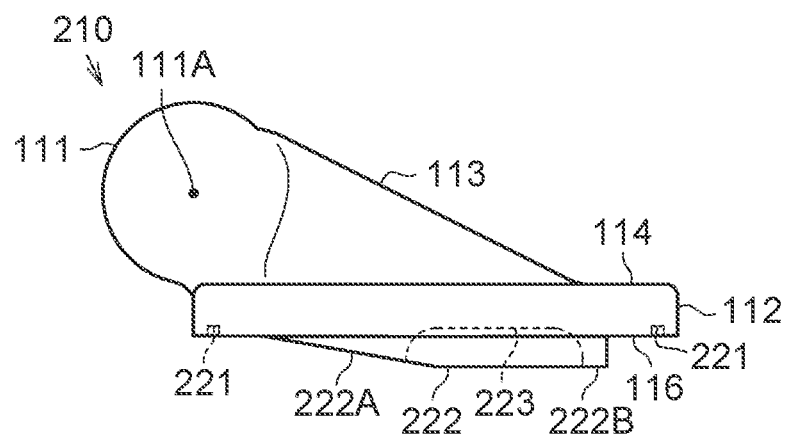
FIG. 11 is a right side view of the wastegate valve according to the embodiment.

As shown in FIG. 11, each protrusion 222 includes a sloping part 222A and a parallel part 222B. The sloping part 222A is a part of the protrusion 222 that is close to the central axis 111A of the shaft 111, i.e., a part on the left side in FIG. 11. A leading end surface of the sloping part 222A, i.e., the lower surface thereof in FIG. 11 is inclined relatively to the valve surface 116. Specifically, the leading end surface of the sloping part 222A is inclined such that an amount of protrusion from the valve surface 116 becomes smaller toward the central axis 111A of the shaft 111.

The parallel part 222B is a part of the protrusion 222 other than the sloping part 222A, i.e., a part thereof on the right side in FIG. 11. A leading end surface of the parallel part 222B, i.e., the lower surface thereof in FIG. 11 is parallel to the valve surface 116. The amount of protrusion of the parallel part 222B from the valve surface 116 is equal to the amount of protrusion of the sloping part 222A at an end thereof that is located closer to the parallel part 222B.

As shown in FIG. 11, the recess 223 is depressed from the leading end surface of the sloping part 222A and the leading end surface of the parallel part 222B. An end of the recess 223 that is located farther away from the central axis 111A of the shaft 111, i.e., the right end thereof in FIG. 11 is located near an end of the parallel part 222B that is located farther away from the central axis 111A of the shaft 111. An end of the recess 223 that is located closer to the central axis 111A of the shaft 111, i.e., the left end thereof in FIG. 11 is located at a portion of the sloping part 222A close to the parallel part 222B. As shown in FIG. 12, when the wastegate valve 210 is seen from a direction orthogonal to the valve surface 116, the entire region of an edge of each recess 223 is located inside an edge of the protrusion 222. As shown in FIG. 13, when the valve body 112 is seen in a section, a region of a bottom surface of each recess 223 including the edge is a curved surface.

As shown in FIG. 10, the depression 224 is depressed from the valve surface 116. As shown in FIG. 12, when the wastegate valve 210 is seen from the direction orthogonal to the valve surface 116, the depression 224 is located over substantially the entire region of a portion of the valve surface 116 that is located between the two protrusions 222. An end of the depression 224 that is located closer to the central axis 111A of the shaft 111, i.e., the upper end thereof in FIG. 12 is located near a portion of the annular groove 221 that is located close to the central axis 111A of the shaft 111. An end of the depression 224 that is located farther away from the central axis 111A of the shaft 111, i.e., the lower end thereof in FIG. 12 is located near a portion of the annular groove 221 that is located far away from the central axis 111A of the shaft 111.

As described above, the protrusions 222 are inserted in the bypass passages 64 when the wastegate valve 210 is in the closed state. Therefore, as shown in FIG. 13, when the wastegate valve 210 is in the closed state, the depression 224 is located at a portion of the valve main body 114 that faces a portion of the valve seat surface 66 located between the two bypass passages 64.

In this embodiment, since the valve main body 114 of the wastegate valve 210 includes the annular groove 221, the two protrusions 222, the two recesses 223, and the depression 224, the valve surface 116 has an annular shape as a whole, as shown in FIG. 12.

As in the first embodiment, the valve surface 116 is a flat surface. Further, as in the first embodiment, the valve surface 116 is inclined. That is, as seen in a section parallel to the central axis 111A of the shaft 111 and including the center of gravity 116C of the valve surface 116, the valve surface 116 is inclined so as to be further displaced in the first direction L1 as it extends further in the first shaft direction S1. Moreover, as seen in a section orthogonal to the central axis 111A of the shaft 111 and including the center of gravity 116C of the valve surface 116, the valve surface 116 is inclined so as to be further displaced toward the side of the first direction L1 in the direction orthogonal to the valve seat surface 66 at it extends further toward the side of the second direction L2 in the direction along the valve seat surface 66.

Workings of Embodiment

As indicated by solid arrows in FIG. 13, even when the wastegate valve 210 is in the closed state, a gap may form between the valve surface 116 and the valve seat surface 66 due to, for example, rattling of the wastegate valve 210 under the pressure of the exhaust gas. In this case, the exhaust gas leaks from the bypass passages 64 to the exhaust passage 63 through the gap between the valve surface 116 and the valve seat surface 66.

Effects of Embodiment

This embodiment has the following effects (2-1) to (2-5) in addition to the effect (1-1) described above.

(2-1) Since the wastegate valve 210 includes the annular groove 221, a hollow is created between an inner surface of the annular groove 221 and the valve seat surface 66 when the wastegate valve 210 is in the closed state. Therefore, if a gap is formed between the valve surface 116 and the valve seat surface 66, this hollow is present in the flow passage through which the exhaust gas leaks. As the cross-sectional area of the flow passage through which the exhaust gas leaks increases suddenly at this hollow, the flow of the exhaust gas is disturbed and the resistance to the flow of the exhaust gas increases. Thus, even when a gap is formed between the valve surface 116 and the valve seat surface 66, the amount of exhaust gas that leaks can be reduced by the hollow defined by the annular groove 221.

(2-2) In this embodiment, the protrusions 222 of the wastegate valve 210 are inserted in the bypass passages 64 of the turbine housing 60 when the wastegate valve 210 is in the closed state. Therefore, to reach between the valve surface 116 and the valve seat surface 66 while the wastegate valve 210 is in the closed state, the exhaust gas flows through a space between an outer circumferential surface of the protrusion 222 and an inner circumferential surface of the bypass passage 64. Thus, the cross-sectional area of the flow passage through which the exhaust gas reaches between the valve surface 116 and the valve seat surface 66 can be reduced by the presence of the protrusion 222. As a result, the amount of exhaust gas that reaches between the valve surface 116 and the valve seat surface 66 can be reduced.

(2-3) The wastegate valve 210 includes the recesses 223. A region of the bottom surface of each recess 223 including the edge is a curved surface. Therefore, as indicated by long dashed double-short dashed arrows in FIG. 13, when the exhaust gas flowing from upstream toward downstream hits a central part of the recess 223 while the wastegate valve 210 is in the closed state, this exhaust gas flows outward. Then, this exhaust gas is guided by the curved surface of the recess 223 so as to flow back from downstream toward upstream. The exhaust gas thus flowing back weakens the flow of the exhaust gas from upstream toward downstream in the bypass passage 64, so that the force of the exhaust gas trying to open the wastegate valve 210 can be reduced. As a result, a gap is less likely to form between the valve surface 116 and the valve seat surface 66, and even when a gap forms, the amount of exhaust gas that leaks through the gap can be reduced.

(2-4) A portion of the wall of the turbine housing 60 that is located between the two bypass passages 64 tends to be affected by the heat of the exhaust gas flowing through the two bypass passages 64. Therefore, the portion of the valve seat surface 66 that is located between the two bypass passages 64 is more prone to thermal expansion than, for example, an outer circumferential portion of the valve seat surface 66.

In this regard, the depression 224 is presented at the portion of the valve body 112 that faces the portion of the valve seat surface 66 located between the two bypass passages 64 when the wastegate valve 210 is in the closed state. Thus, even when the valve seat surface 66 thermally expands due to the heat of the exhaust gas as described above, it is less likely that only the portion of the valve seat surface 66 located between the two bypass passages 64 may contact the valve surface 116. As a result, a gap is less likely to form between an outer circumferential portion of the valve surface 116 and an outer circumferential portion of the valve seat surface 66.

Figure 14:
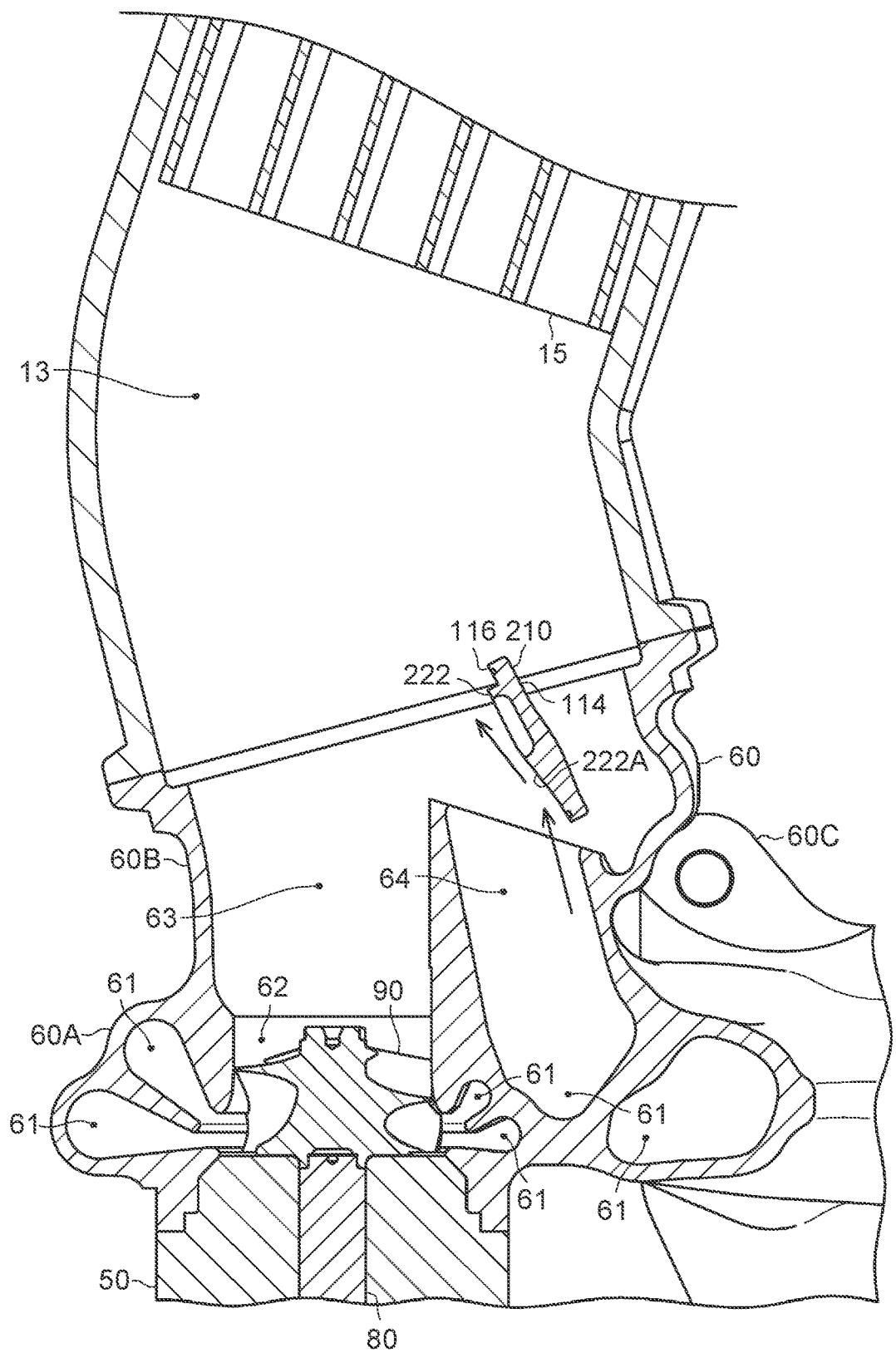
FIG. 14 is a view illustrating a configuration around a turbine housing according to the embodiment.

(2-5) As indicated by solid arrows in FIG. 14, part of the exhaust gas from the bypass passage 64 hits the protrusion 222 that protrudes from the valve surface 116 in the wastegate valve 210 while the wastegate valve 210 is in the open state. When the exhaust gas thus hits the protrusion 222 and the flow of the exhaust gas is thereby disturbed, the entire flow of the exhaust gas flowing through the exhaust passage 13 is disturbed, which hinders a smooth flow of the exhaust gas. In addition, as the flow of the exhaust gas is disturbed, the exhaust gas may fail to have a warming effect on the catalyst 15 as expected.

In this regard, the leading end surface of the sloping part 222A is inclined such that the amount of protrusion from the valve surface 116 becomes smaller toward the central axis 111A of the shaft 111, i.e., toward the bypass passage 64. Thus, the exhaust gas having flowed through the bypass passage 64 does not hit a side surface of the protrusion 222 and flows roughly along the leading end surface of the sloping part 222A. As a result, the flow of the exhaust gas having flowed through the bypass passage 64 is less likely to be disturbed.

Modified Examples

The embodiments can be implemented with the following changes made thereto. The embodiments and the following modified examples can be implemented in combination to such an extent that no technical inconsistency arises.

First Direction

In the first embodiment and the second embodiment, the first direction L1 is not limited to the example of the embodiments. For example, when described with reference to FIG. 8, the first direction L1 may be a direction such as a direction toward the left lower side in FIG. 8, a direction toward the left upper side in FIG. 8, or a direction toward the right upper side in FIG. 8. The first direction L1 may be any direction that is, like these directions, inclined relatively to the valve seat surface 66 as seen from the direction along the central axis 69A of the through-hole 69. If the first direction L1 is thus inclined relatively to the valve seat surface 66, the likelihood of formation of a gap between the valve surface 116 and the valve seat surface 66 can be reduced by applying the technique of the present disclosure.

As a specific example, the configuration of the valve surface 116 when the first direction is oriented toward the left lower side in FIG. 8 will be described. In this case, with respect to the center of gravity 116C, the end 116D of the valve surface 116 in the first shaft direction S1 is located on the side of the first direction in the direction orthogonal to the central axis 111A of the shaft 111. Moreover, with respect to the center of gravity 116C, the end of the valve surface 116 on the side of the second direction in the direction along the valve seat surface 66 is located on the side of the first direction in the direction orthogonal to the valve seat surface 66.

Annular Groove

In the second embodiment, the number of the annular groove 221 can be changed. For example, the wastegate valve 210 may include two annular grooves 221 corresponding to the two bypass passages 64. In this configuration, when the wastegate valve 210 is in the closed state, one of the two annular grooves 221 extends in the valve surface 116 so as to surround one of the two bypass passages 64. Further, when the wastegate valve 210 is in the closed state, the other one of the two annular grooves 221 extends in the valve surface 116 so as to surround the other one of the two bypass passages 64. In this configuration, to adopt two annular grooves 221, the shape of the depression 224 may be changed or the depression 224 may be omitted. Further, for example, a plurality of annular grooves 221 may be concentrically provided in the valve surface 116.

In the second embodiment, the annular groove 221 may be omitted.

Protrusion

In the second embodiment, the shape of the protrusion 222 can be changed. For example, the protrusion 222 may not have the sloping part 222A and the amount of protrusion of the entire protrusion 222 from the valve surface 116 may be constant.

In the second embodiment, the number of the protrusions 222 can be changed. For example, in some cases, the amount of exhaust gas that leaks through one of the two bypass passages 64 while the wastegate valve 210 is in the closed state is larger than that through the other one of the two bypass passages 64. In such cases, the wastegate valve 210 may include only one protrusion 222 that is inserted into one of the two bypass passages 64. Further, for example, all the protrusions 222 may be omitted.

Recess

In the second embodiment, the number of the recesses 223 can be changed. For example, the recess 223 may be provided in only one of the two protrusions 222. Further, for example, a plurality of recesses 223 may be provided in one protrusion 222. Moreover, for example, all the recesses 223 may be omitted.

The recess 223 need not be necessarily provided in the protrusion 222. For example, when the protrusion 222 is not adopted, a recess 223 that is depressed from the valve surface 116 may be adopted.

The shape of the recess 223 may be changed. For example, the recess 223 may be depressed in a hemispherical shape. That is, the entire region of the inner surface of the recess 223 may be a curved surface. Further, for example, the inner surface of the recess 223 may not be a curved surface. Also in this configuration, the presence of the recess 223 can cause part of the exhaust gas that has hit the recess 223 to flow back from downstream toward upstream.

Depression

In the second embodiment, the shape of the depression 224 can be changed. For example, the depression 224 may be provided at only a part of the portion of the valve surface 116 located between the two protrusions 222. This configuration can also reduce the adverse influence of expansion of the portion of the valve seat surface 66 that faces the depression 224 when the wastegate valve 210 is in the closed state.

In the second embodiment, the depression 224 may be omitted. For example, if thermal expansion of the valve seat surface 66 is relatively minor, omitting the depression 224 has little impact.

Other Configurations

In the first embodiment and the second embodiment, the number of the bypass passages 64 can be changed. For example, the number of the bypass passages 64 may be one, or three or more. In this case, the number of the protrusions 222, the number of the recesses 223, and the number of the depression 224 can be changed according to the number of the bypass passages 64. When the number of the bypass passages 64 is one, the depression 224 can be omitted.

What is claimed is:

1. A turbocharger comprising:
    a turbine wheel that is rotated by a flow of exhaust gas;
    a turbine housing that houses the turbine wheel and includes a bypass passage for the exhaust gas between an upstream side and a downstream side of the turbine wheel;
    a wastegate valve that opens and closes the bypass passage; and
    a link mechanism that transmits a driving force from an actuator to the wastegate valve, wherein
    the turbine housing includes
        a valve seat surface that is flat and contacts the wastegate valve when the wastegate valve is in a closed state, and
        a through-hole that extends through a wall of the turbine housing,
    the wastegate valve includes
        a shaft that extends through the through-hole and is rotatably supported by the turbine housing, and
        a valve body that extends in a radial direction of the shaft from an end of the shaft that is inside the turbine housing,
    the valve body includes a valve surface that is flat and faces the valve seat surface when the wastegate valve is in the closed state,
    the shaft and the valve body are an integrally molded part,
    a first direction is a direction of a force that the link mechanism applies to an end of the shaft that is outside the turbine housing while the wastegate valve is in the closed state,
    a first shaft direction is along a central axis of the shaft from an outside toward an inside of the turbine housing,
    the first direction is inclined relative to the valve seat surface as seen from along a central axis of the through-hole;
    the valve seat surface is parallel to the central axis of the through-hole;
    in a section that is parallel to the central axis of the shaft and that includes the center of gravity of the valve surface, an end of the valve surface in the first shaft direction is closer to the valve seat surface in a direction orthogonal to the central axis of the shaft than the valve surface at the center of gravity; and
    in a section that is orthogonal to the central axis of the shaft and that includes the center of gravity of the valve surface, when the central axis of the shaft and the central axis of the through-hole coincide with each other and the wastegate valve is in the closed state, an end of the valve surface on the opposite side of the center of gravity from the first direction along the valve surface is closer to the valve seat surface in a direction orthogonal to the valve seat surface than the valve surface at the center of gravity;
    a first position on a perimeter of the valve surface closest to the valve seat surface is
        between (a) the section that is parallel to the central axis of the shaft and (b) the section that is orthogonal to the central axis of the shaft, and
        opposite the shaft; and
    a second position on the perimeter of the valve surface furthest from the valve seat surface is diametrically opposed to the first position.

2. The turbocharger according to claim 1, wherein:
    the valve surface has an annular groove that is depressed; and
    the annular groove extends in the valve surface to surround the bypass passage when the wastegate valve is in the closed state.

3. The turbocharger according to claim 1, wherein:
    the turbine housing defines a plurality of bypass passages that opens in the valve seat surface;
    the valve body has a depression that is depressed from the valve surface; and
    the depression is at a portion of the valve body facing a portion that is between the bypass passages when the wastegate valve is in the closed state.

4. The turbocharger according to claim 1, wherein:
    the wastegate valve has a protrusion that protrudes from the valve surface; and
    the protrusion is inserted in the bypass passage when the wastegate valve is in the closed state.

5. The turbocharger according to claim 4, wherein:
    a leading end surface of the protrusion has a recess that is depressed; and
    at least part of an inner surface of the recess is a curved surface.

* * * * *